(12) United States Patent
Dillon et al.

(10) Patent No.: US 6,380,313 B1
(45) Date of Patent: Apr. 30, 2002

(54) POLYMER PROCESSING ADDITIVE CONTAINING A PERFLUOROVINYLETHER-MODIFIED FLOUROPOLYMER AND A MELT PROCESSABLE THERMOPLASTIC POLYMER COMPOSITION EMPLOYING THE SAME

(75) Inventors: Maria P. Dillon, St. Paul, MN (US); Harald Kaspar; Bernhard Hirsch, both of Burgkirchen (DE); Klaus Hintzer, Woodbury; Karl-Dieter Weilandt, Minneapolis, both of MN (US)

(73) Assignee: Dyneon LLC, Oakdale, MN (US)

( * ) Notice: Subject to any disclaimer, the term of this patent is extended or adjusted under 35 U.S.C. 154(b) by 0 days.

(21) Appl. No.: 09/604,392

(22) Filed: Jun. 27, 2000

(51) Int. Cl.[7] ............................ C08L 27/12; C08L 23/02
(52) U.S. Cl. ...................... 525/200; 524/380; 525/199; 525/231; 525/240; 526/247; 526/255
(58) Field of Search ................................ 526/247, 255; 525/199, 200, 231, 240

(56) References Cited

U.S. PATENT DOCUMENTS

| | | |
|---|---|---|
| 3,125,547 A | 3/1964 | Blatz |
| 4,335,238 A | 6/1982 | Moore et al. ............... 526/254 |
| 4,558,141 A | 12/1985 | Squire ........................ 549/455 |
| 4,855,013 A | 8/1989 | Ohta et al. .................. 156/601 |
| 4,904,735 A | 2/1990 | Chapman, Jr. et al. ..... 525/199 |
| 5,015,693 A | 5/1991 | Duchesne et al. .......... 525/187 |
| 5,064,594 A | 11/1991 | Priester et al. ............... 264/127 |
| 5,132,368 A | 7/1992 | Chapman, Jr. et al. ..... 525/165 |
| 5,284,184 A | 2/1994 | Noone et al. ................ 138/121 |
| 5,397,897 A | 3/1995 | Komatsu et al. ......... 250/338.4 |
| 5,464,904 A | 11/1995 | Chapman, Jr. et al. ..... 525/200 |
| 5,710,217 A | 1/1998 | Blong et al. ................. 525/199 |

FOREIGN PATENT DOCUMENTS

| | | | |
|---|---|---|---|
| CA | 2147045 | 10/1995 | |
| EP | 0 889 828 A2 | 7/1999 | ......... C07C/317/18 |
| WO | WO 91/05021 | 4/1991 | ......... C08L/101/00 |

OTHER PUBLICATIONS

A. Rudin et al., "Fluorocarbon Elastomer Aids Polyolefin Extrusion," *Plastics Engineering*, Mar. 1986, at pp. 63–66.
R.F. Westover, "Melt Extrusion," *Encyclopedia of Polymer Science & Technology*, vol. 8, pp. 573–581 (John Wiley & Sons, 1968).
Rauuendaal, C., "Polymer Extrusion," Hansen Publishers, p. 23–48, 1986.

*Primary Examiner*—Fred Zitomer
(74) *Attorney, Agent, or Firm*—James V. Lilly

(57) ABSTRACT

A polymer processing aid composition, a melt processable polymer composition that uses the polymer processing aid, and a method of improving the melt processability of a thermoplastic polymer are provided. The polymer processing aid composition comprises a fluoropolymer that comprises interpolymerized units derived from a perfluorovinyl ether, preferably one having the formula $CF_2=CF-(OCF_2CF(CF_3))_AOR_f$ where a has a value of 0 to 3 and $R_f$ is a perfluoroaliphatic (preferably perfluoroalkyl or perfluoroalkoxy) having from 1 to 8 (preferably 1 to 3) carbon atoms.

22 Claims, 5 Drawing Sheets

POLYMER PROCESSING ADDITIVE CONTAINING A PERFLUOROVINYLETHER-MODIFIED FLOUROPOLYMER AND A MELT PROCESSABLE THERMOPLASTIC POLYMER COMPOSITION EMPLOYING THE SAME

FIELD OF THE INVENTION

This invention relates to fluoropolymer processing additives that employ a vinylether monomer; to a melt processable thermoplastic polymer composition that utilizes this polymer processing additive; and to a method of improving the melt processability of a melt processable thermoplastic polymer.

BACKGROUND

For any melt processable thermoplastic polymer composition, there exists a critical shear rate above which the surface of the extrudate becomes rough and below which the extrudate will be smooth. See, for example, R. F. Westover, *Melt Extruision*, Encyclopedia of Polymer Science and Technology, Vol. 8, pp 573–81 (John Wiley & Sons 1968). The desire for a smooth extrudate surface competes, and must be optimized with respect to, the economic advantages of extruding a polymer composition at the fastest possible speed (i.e. at high shear rates).

Some of the various types of extrudate roughness and distortion observed in melt processable polymers, especially high and low density polyethylenes, are described by A. Rudin, et al., Fluorocarbon Elastomer Aids Polyolefin Extrusion, Plastics Engineering, March 1986, at 63–66. The authors state that for a given set of processing conditions and die geometry, a critical shear stress exists above which polyolefins such as linear low-density polyethylene (LLDPE), high-density polyethylene (BDPE), and polypropylene suffer melt defects. At low shear rates, defects may take the form of "sharkskin", a loss of surface gloss, that in more serious manifestations appears as ridges running more or less transverse to the extrusion direction. At higher rates, the extrudate can undergo "continuous melt fracture" becoming grossly distorted. At rates lower than those at which continuous melt fracture is first observed, LLDPE and HDPE can also suffer from "cyclic melt fracture", in which the extrudate surface varies from smooth to rough. The authors state further that lowering the shear stress by adjusting the processing conditions or changing the die configuration can avoid these defects to a limited extent, but not without creating an entirely new set of problems. For example, extrusion at a higher temperature can result in weaker bubble walls in tubular film extrusion, and a wider die gap can affect film orientation.

There are other problems often encountered during the extrusion of thermoplastic polymers. They include a build up of the polymer at the orifice of the die (known as die build up or die drool), increase in back pressure during extrusion runs, and excessive degradation or low melt strength of the polymer due to high extrusion temperatures. These problems slow the extrusion process either because the process must be stopped to clean the equipment or because the process must be run at a lower speed.

Certain fluorocarbon processing aids are known to partially alleviate melt defects in extrudable thermoplastic hydrocarbon polymers and allow for faster, more efficient extrusion. U.S. Pat. No. 3,125,547 to Blatz, for example, first described the use of fluorocarbon polymer process aids with melt-extrudable hydrocarbon polymers wherein the fluorinated polymers are homopolymers and copolymers of fluorinated olefins having an atomic fluorine to carbon ratio of at least 1:2 and wherein the fluorocarbon polymers have melt flow characteristics similar to that of the hydrocarbon polymers.

U.S. Pat. No. 4,904,735 (Chapman, Jr. et al.) describes a fluorinated processing aid for use with a difficultly melt-processable polymer comprising (1) a fluorocarbon copolymer which at the melt-processing temperature of the difficulty melt-processable polymer is either in a melted form if crystalline, or is above its glass transition temperature if amorphous, and (2) at least one tetrafluoroethylene homopolymer or copolymer of tetrafluoroethylene and at least one monomer copolymerizable therewith wherein the mole ratio is at least 1:1, and which is solid at the melt-processable temperature of the difficultly melt-processable polymer.

U.S. Pat. No. 5,397,897 to Morgan at al. describes the use of copolymers of tetrafluoroethylene and hexafluoropropylene having high hexafluoropropylene content as processing aids in polyolefins.

U.S. Pat. Nos. 5,064,594 to Priester et al., and 5,132,368 to Chapman, Jr. et al. describe the use of certain fluoropolymer process aids containing functional polymer chain end groups including —COF, —$SO_2F$, $SO_3M$, —$OSO_3M$, —COOR and —COOM, wherein R is a $C_{1-3}$ alkyl group and M is hydrogen, a metal cation, or a quaternary ammonium cation for use with a difficultly melt-processable polymer. The fluoropolymer is selected from the group consisting of (i) irradiated polytetrafluoroethylene, (ii) a partially crystalline copolymer of tetrafluoroethylene and a perfluoro(alkyl vinyl ether) or a perfluoroolefin containing 3–8 carbon atoms, (iii) an elastomeric copolymer of tetrafluoroethylene and a perfluoro(alkyl vinyl ether), (iv) a copolymer of vinylidene fluoride, hexafluoropropylene and tetrafluoroethylene and (v) a copolymer of one or more fluoroolefins and 0.5–40 mole % of a functional-group-containing monomer

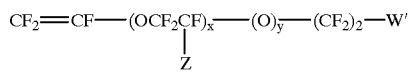

wherein Z is —F or —$CF_3$, x is 0 or an integer of 1–4, y is 0 or 1, z is an integer of 1–12, and W' is selected from the functional groups —$SO_2F$, —$SO_2Cl$, —$SO_3H$, —COOR or —COOM, wherein R is $C_{1-3}$ alkyl and M is hydrogen, a metal cation, preferably an alkali metal cation, or a quaternary ammonium cation, said fluoropolymer containing at least 100 functional groups W per million carbon atoms. Such functional groups are either thermally unstable or are chemically reactive to basic and/or acidic functionalities present in the extrudable resin or in adjuvants incorporated into the extrudable composition.

U.S. Pat. No. 5,464,904 to Chapman et al. discloses the use of unimodal semicrystalline fluoroplastics such as copolymers of tetrafluoroethylene and hexafluoropropylene and terpolymers of tetrafluoroethylene, hexafluoropropylene and vinylidene fluoride with a polyolefin. The only enhancement of melt-processability described in this patent is shown in Example 25 where a concentration of 1000 ppm of the fluoropolymer in linear low density polyethylene is said to reduce the extrusion pressure of the extrudable composition. There is no showing of a reduction in melt defects.

U.S. Pat. Nos. 5,015,693 and 4,855,013 to Duchesne and Johnson disclose the use of a combination of a poly(oxyalkylene) polymer and a fluorocarbon polymer as a processing additive for thermoplastic hydrocarbon polymers. The poly(oxyalkylene) polymer and the fluorocarbon polymer are used at such relative concentrations and proportions as to reduce the occurrence of melt defects during extrusion. Generally the concentration of the fluoropolymer is present at a level of from 0.005 to 0.2 weight percent of the final extrudate and the poly(oxyalkylene) polymer is present at a level of from 0.01 to 0.8 weight percent of the final extrudate. Preferably, the weight of the fluorocarbon polymer in the extrudate and the weight of the poly(oxyalkylene) polymer in the extrudate are in a ratio of 1:1 to 1:10.

U.S. Pat. No. 5,710,217 to Blong at al. Discloses an extrudable thermoplastic hydrocarbon composition that comprises an admixture of a melt processable hydrocarbon polymer as the major component and an effective amount of a chemically-resistant fluoropolymer process aid. The fluoropolymer contains at least 50% by weight of fluorine and comprises one or more fluoropolymers that are essentially completely ethylenically unsaturated.

While prior processing additives have been useful, there is still a need to provide an improved fluoropolymer processing additive. It is desirable to provide a processing additive that gives improved melt processability as is discussed below. It is also desirable to provide a processing additive that is chemically stable towards aggressive host polymers (e.g., polar non-hydrocarbon host polymers such as nylon, etc.) and/or aggressive adjuvants employed in the host polymer (e.g., antioxidants such as HALS, etc.). Furthermore, it is desirable to provide a processing additive that is essentially free of groups that can degrade or undergo chemical interaction (e.g., hydrolysis, decarboxylation, etc.) during melt processing.

SUMMARY

It has been discovered that a processing additive based upon a fluoropolymer that has been modified to include units derived from a perfluorovinyl ether as is described below is surprisingly effective in improving the melt processability of thermoplastic polymers.

The improvement in melt processability achieved by the present invention manifests itself in one or more ways. For example, the improvement may reduce, or eliminate, melt defects in a melt processed host polymer. It may postpone the occurrence of melt defects to a higher extrusion rate (i.e., shear rate) than is normally achieved without the use of the processing additive composition of the invention. It may reduce the occurrence of die build up experienced during the extrusion of the host polymer, especially non-hydrocarbon host polymers. This is advantageous because it reduces the amount of back pressure during extrusion of non-hydrocarbon polymers, and permits the use of lower extrusion temperatures to achieve an equivalent throughput.

Other advantages of the invention include the ability to tailor the melting point of the processing additive by varying the level of the perfluorovinyl ether employed in it. In a preferred embodiment of the invention it is possible to provide a processing additive having a melting point in the range of 60–200° C.

Briefly, in one aspect, the present invention provides a polymer processing additive composition based on a fluoropolymer that contains interpolymerized units derived from a monomer composition of (i) a perfluorovinyl ether of the formula $$CF_2=CF-(OCF_2CF(CF_3))_AOR_f \qquad (I)$$

where A has a value of from 0 to 3 (preferably from 1 to 3) and $R_f$ is a fluoroaliphatic group, preferably a fluoroalkyl or a fluoroalkoxyalkyl group, of 1 to 8, preferably 1 to 3, carbon atoms.

(ii) a fluorinated olefinic monomer having the formula $$RCF=CR_2 \qquad (II)$$

where each R may be the same or different from each other and is selected from H, F, Cl, alkyl of from 1 to 8 carbon atoms or a perfluoro alkyl of from 1 to 8 carbon atoms;

(iii) a non-fluorinated olefinic monomer having the formula $$CH_2=CR'_2 \qquad (III)$$

wherein R' is H, Cl or an aliphatic group having from 1 to 8 carbon atoms.

The monomer composition is made up of from 0.1 to 10 (preferably from 1 to 8) percent by weight of the monomer of Formula I, from 60 to 99.9 (preferably from 70 to 95) percent by weight of at least one monomer of Formula II, and from 0 to 30 (preferably from 10 to 20) percent by weight of the monomer of Formula III. When the monomer composition contains no monomer of Formula III, it comprises from 0.1 to 10 percent by weight of the monomer of Formula I and from 90 to 99.9 percent by weight of two different monomers of Formula II.

The processing additive composition of the invention can be used per se. Alternatively, it can be combined with fluoropolymers that have not been modified with a perfluorovinyl ether. The performance of the non-modified fluoropolymer can be improved by blending a modified fluoropolymer with it so that the overall blend of the two fluoropolymers comprises 0.1 to 10 percent by weight of the monomer of Formula I.

In another aspect, the present invention provides a novel melt processable polymer composition that comprises a major amount (i.e., at least 50% by weight) of a melt processable thermoplastic host polymer and a minor, but effective, amount of the processing additive composition based on the perfluorovinyl ether-modified fluoropolymer.

In yet another aspect, the present invention provides a method for improving the melt processability of the host polymer. In this method the host polymer is combined with an effective amount of the processing additive composition. The resulting melt procesable polymer composition is mixed until there is preferably a uniform distribution of the processing additive composition in the host polymer. The polymer composition is then melt processed.

As used herein, an effective amount of the processing additive composition is an amount that improves the melt processability of the host polymer during extrusion over the melt processability of a host polymer that does not employ the fluoropolymer-based processing additive composition of the invention.

DETAILED DESCRIPTION

Figure 1:
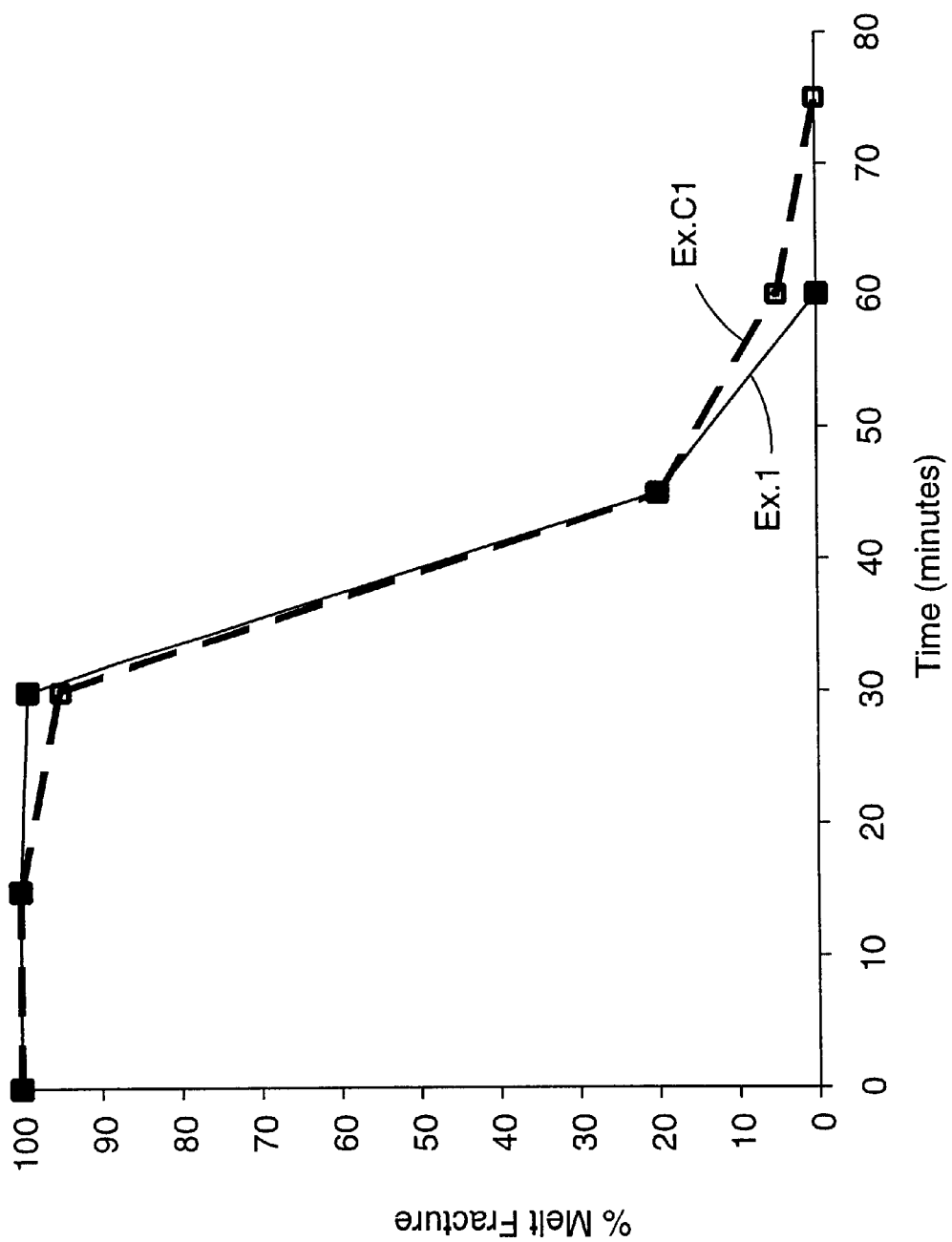
FIGS. 1–5 are plots showing the time to clear melt fracture for a number of fluoropolymer processing additives including those of the invention.

The amount of the fluoropolymer used as a process additive in this invention is typically relatively low. The exact amount used may be varied depending upon whether the melt-processable composition is to be extruded into its final form (e.g., a film or shaped part) or whether it is to be used as a masterbatch which is to be further diluted with additional host polymer before being extruded into its final form. Generally, the fluoropolymer comprises from about 0.005 to 50 weight percent of the melt processable polymer composition. If the melt processable polymer composition is a masterbatch, the amount of the fluoropolymer may vary between about 2 to 50 weight percent of the composition. If the melt processable polymer composition is to be extruded into final form and is not further diluted by the addition of host polymer, it typically contains a lower concentration of the fluoropolymer, e.g., about 0.005 to 2 weight percent, and preferably about 0.01 and 0.2 weight percent of the melt-processable composition. In any event, the upper concentration of tile fluoropolymer used is generally determined by economic limitations rather than by any adverse physical effect of the concentration of the processing aid.

The fluoropolymers useful in the invention include both amorphous and partially crystalline (also referred to herein as semi-crystalline) fluoropolymers. Amorphous fluoropolymers usually do not exhibit a melt point. Semi-crystalline fluoropolymers are melt processable per se and have either a melt point or have a glass transition temperature above ambient temperature. Preferably these semicrystalline fluoropolymers have a peak melting temperature of from 60 to 200° C.

The selection of an amorphous or semicrystalline fluoropolymer for use in the invention is influenced by a number of factors such as the host polymer being used and the processing conditions being employed. In any event, the fluoropolymers are incompatible with the host polymer yet possess a melt viscosity that permits an easy and efficient incorporation into the host polymer melt.

Representative examples of useful perfluorovinyl ethers of Formula I useful in the monomer composition include, but are not limited to,

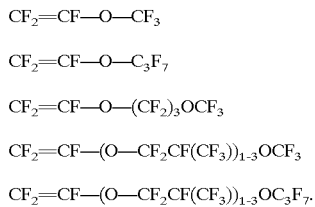

Representative examples of useful fluorinated monomers of Formula II useful in the monomer composition include, but are not limited to, vinylidene fluoride, tetrafluoroethylene, hexafluoropropylene, chlorotrifluoroethylene, 2-chloropentafluoropropene, dichlorodifluoroethylene, 1,1-dichlorofluoroethylene, and mixtures thereof Perfluoro-1,3-dioxoles may also be used. The perfluoro-1,3-dioxole monomers and their copolymers are described in U.S. Pat. No. 4,558,141 (Squires).

Representative examples of useful non-fluorinated olefinic monomers of Formula III useful in the monomer composition include ethylene, propylene, butylene, etc.

Examples of specific fluoropolymers useful in the invention include those derived from the interpolymerization of the Formula I monomer with two or more different Formula II monomers. Examples of such polymers are those derived from (A) Interpolymerized units derived from a monomer of Formula I, vinylidene fluoride (VDF) and hexafluoropropylene (RFP). Preferably, these fluoropolymers have interpolymerized units derived from 0.1 to 10 (more preferably from 1 to 8) weight percent of a monomer of Formula 1, 60 to 98 (more preferably from 70 to 95) weight percent of VDF and from 2 to 40 (more preferably from 5 to 30) weight percent HFP.

(B) Interpolymerized units derived from a monomer of Formula I, tetrafluoroethylene (TFE) and at least one copolymerizable fluoromonomer of Formula II other than TFE, e.g., HFP and VDF. Preferably these fluoropolymers have interpolymerized units derived solely from (i) 0.1 to 10 weight percent of the Formula I monomer, (ii) from 30 to 70 weight percent of TFE, and (iii) from 10 to 60 weight percent of HFP, VDF or a combination thereof.

(C) Interpolymerized units derived from a monomer of Formula I, one or more Formula II monomers, and a Formula III monomer. Fluoropolymers derived from copolymerization of a monomer composition of 0.1 to 10 weight percent of the Formula I monomer, from 75 to 98 weight percent of one or more Formula II monomers and from 5 to 30 weight percent of a Formula III monomer. One preferred fluoropolymer of this class is derived from a monomer composition of from 0.1 to 10 weight percent of the Formula I monomer, 80 to 90 weight percent tetrafluoroethylene, and 5 to 20 weight percent propylene. Another preferred fluoropolymer of this class is derived from a monomer composition of from 0.1 to 10 weight percent of the Formula I monomer, 50 to 70 weight percent of tetrafluoroethylene, 15 to 40 weight percent of hexafluoropropylene, and 5 to 20 weight percent of ethylene.

An especially useful fluoropolymer of this type useful in the invention comprises interpolymerized units derived from (i) TFE, (ii) VDF, (iii) at least one ethylenically unsaturated fluoromonomer of the formula $CF_2=CFR'_f$ where $R'^f$ is perfluoroalkyl of 1 to 8, preferably 1 to 3, carbon atoms, and (iv) a perfluorovinyl ether of Formula I, Polymers of this type are described in copending application U.S. Ser. No. 09/604,178 filed of even date herewith. These polymers typically have a melting point in the range of 30 to 280° C; a hydrogen content of less than 5% by weight and a fluorine content of from 50 to 75%. Most preferably these polymers consist essentially of interpolymerized units derived from the four enumerated monomers.

Preferably, these quadratic polymers comprise interpolymerized units derived from (i) 30 to 70 weight percent (more preferably 35 to 65 weight percent) tetrafluoroethylene, (ii) 5 to 55 weight percent (more preferably 15 to 45 weight percent) vinylidene fluoride, (iii) 5 to 40 weight percent (more preferably from 10 to 25 weight percent) of a comonomer of the formula $CF_2=CFR'_f$, and (iv) 0.1 to 10 weight percent (preferably 2 to 9 weight percent) of a perfluorovinyl ether of the formula $CF_2=CF-(OCF2CF(CF_3))_aOR'_f$. A preferred species of this quadpolymer contains interpolymerized units derived from 45 to 65 weight percent tetrafluoroethylene, 15 to 35 weight percent vinylidene fluoride, 10 to 30 weight percent of the comonomer of component (iii), and 2 to 6 weight percent of the comonomer of component (iv).

The fluoropolymers useful in the invention can be prepared in a number of ways. For example, the polymer can be produced by means of free radical polymerization of the monomers.

The molecular weight of the fluoropolymers useful in the invention is not critical and may vary over a wide range.

Thus, the molecular weight may vary from low molecular weight to ultra high molecular weight. The molecular weight of a semicrystalline polymer is often described by its melt flow index (MFI). Stated numerically the MFI of the fluoropolymer may vary from 0.1 (an ultra high molecular weight material) to 100 or greater (a very low molecular weight material). Preferably, the fluoropolymers are multimodal, that is they have a relatively low molecular weight component A, a relatively high molecular weight component B, and optionally an ultrahigh molecular weight component C.

Generally the ratio of $MFI_A:MFI_B$ is at least 2:1. Preferably the ratio is from 2:1 to 300:1. More preferably the ratio is from 2:1 to 100:1 most preferably from 5:1 to 50:1.

Even though the multimodal polymer of the invention comprises at least two components of different molecular weight, and hence different MFI values, it possesses an overall MFI value ($MFI_O$). Typically this value is in the range of from 1 to 500. Preferably $MFI_O$ is from 2–100 and more preferably from 2 to 40.

The measurement of the MFI value for the low and high molecular weight components was carried out in accordance with ISO 12086 or ASTM D-1238 at a support weight of 5 kg and a temperature of 265° C. The MFIs cited here were obtained with a standardized extrusion die of 2.1 mm diameter and a length of 8 mm. In the case of narrowly distributed unimodal test samples, the MFI represents one point in the Newtonian viscosity range.

The molecular weight of a fluoroelastomer can be described by Mooney Viscosity (ML) which was measured according to ASTM D1646, using a 1 minute pre-heat and a 10 minute test at 121° C. Fluoroelastomers useful in the invention have ML ranging from 5 to 120.

The ratio of the high molecular weight component (A) to the low molecular component B can fluctuate within wide limits. In general, the ratio is in the range of 1:99 to 99:1 parts by weight of A:B. In particular, the ratio is preferably in the range of from 1:99 to 2:80, more preferably from 75:25 to 25:75.

The amount of the ultrahigh molecular weight component (C) typically amounts to from 0 to 15% by weight of the total weight of components A and B.

In another preferred embodiment of the invention the fluoropolymers are not reactive with the host polymer or the other additives used in the extrudable compositions. In one aspect of this embodiment, when the host polymer contains a reactive moiety (e.g., a basic (e.g., amine) or an acidic functionality), it is most preferred that the fluoropolymer contain 15% by weight or less of interpolymerized units derived from a monomer that produces an acidic hydrogen on the backbone of the resulting fluoropolymer. In another aspect of this embodiment, the fluoropolymer is not reactive with adjuvants that contain basic or amine functionalities (e.g., hindered amine light stabilizers). In general, the desired monomers can be copolymerized in an aqueous colloidal dispersion in the presence of water-soluble initiators which produce free radicals such as ammonium or alkali metal persulfates or alkali metal permanganates, and in the presence of emulsifiers such as the ammonium or alkali metal salts of perfluorooctanoic acid. See for example, U.S. Pat. No. 4,335,238 or Canadian Pat. No. 2,147,045. They may also be prepared using a fluorinated sulfinate as a reducing agent and a water soluble oxidizing agent capable of converting the sulfinate to a sulfonyl radical. Preferred oxidizing agents are sodium, potassium, and ammonium persulfates, perphosphates, perborates, and percarbonates. Particularly preferred oxidizing agents are sodium, potassium, and ammonium persulfates.

Aqueous emulsion and suspension polymerizations can be carried out in conventional steady-state conditions in which, for example, monomers, water, surfactants, buffers and catalysts are fed continuously to a stirred reactor under optimum pressure and temperature conditions while the resulting emulsion or suspension is removed continuously. An alternative technique is batch or semibatch polymerization by feeding the ingredients into a stirred reactor and allowing them to react at a set temperature for a specified length of time or by charging ingredients into the reactor and feeding the monomer into the reactor to maintain a constant pressure until a desired amount of polymer is formed.

A wide variety of polymers are useful as the host polymer in the present invention. Useful host polymers are substantially non-fluorinated polymers that are sometimes referred to as being difficultly melt processable. They include both hydrocarbon and non-hydrocarbon polymers. Examples of useful host polymers include, but are not limited to, polyamides, polyimides, polyurethanes, polyolefins, polystyrenes, polyesters, polycarbonates, polyketones, polyureas, polyvinyl resins, polyacrylates and polymethylacrylates.

A particularly useful class of host polymers are polyolefins. Representative examples of polyolefins useful in the present invention are polyethylene, polypropylene, poly(1-butene), poly(3-methylbutene), poly(4-methylpentene) and copolymers of ethylene with propylene, 1-butene, 1-hexene, 1-octene, 1-decene, 4-methyl-1-pentene, and 1-octadecene.

Representative blends of polyolefins useful in the invention are blends of polyethylene and polypropylene, linear or branched low-density polyethylenes, high-density polyethylenes, and polyethylene and olefin copolymers containing said copolymerizable monomers, some of which are described below, e.g., ethylene and acrylic acid copolymers; ethylene and methyl acrylate copolymers; ethylene and ethyl acrylate copolymers; ethylene and vinyl acetate copolymers; ethylene, acrylic acid, and ethyl acrylate copolymers; and ethylene, acrylic acid, and vinyl acetate copolymers.

The polyolefins may be obtained by the homopolymerization or copolymerization of olefins, as well as copolymers of one or more olefins and up to about 30 weight percent or more, but preferably 20 weight percent or less, of one or more monomers that are copolymerizable with such olefins, e.g. vinyl ester compounds such as vinyl acetate. The olefins may be characterized by the general structure $CH_2=CHR$, wherein R is a hydrogen or an alkyl radical, and generally, the alkyl radical contains not more than 10 carbon atoms, preferably from one to six carbon atoms. Representative olefins are ethylene, propylene, 1-butene, 1-hexene, 4-methyl-1-pentene, and 1-octene. Representative monomers that are copolymerizable with the olefins include: vinyl ester monomers such as vinyl acetate, vinyl propionate, vinyl butyrate, vinyl chloroacetate, and vinyl chloropropionate; acrylic and alpha-alkyl acrylic acid monomers and their alkyl esters, amides, and nitriles such as acrylic acid, methacrylic acid, ethacrylic acid, methyl acrylate, ethyl acrylate, N,N-dimethyl acrylamide, methacrylamide, and acrylonitrile; vinyl aryl monomers such as styrene, o-methoxystyrene, p-methoxystyrene, and vinyl naphthalene; vinyl and vinylidene halidemonomers such as vinyl chloride, vinylidene chloride, and vinylidene bromide; alkyl ester monomers of maleic and fumaric acid and anhydrides thereof such as dimethyl maleate, diethyl maleate, and maleic anhydride; vinyl alkyl ether monomers such as vinyl methyl ether, vinyl ethyl ether, vinyl isobutyl ether, and 2-chloroethyl vinyl ether; vinyl pyridine monomers; N-vinyl carbazole monomers; and N-vinyl pyrrolidine monomers.

Useful host polymers also include the metallic salts of the olefin copolymers, or blends thereof, that contain free carboxylic acid groups. Illustrative of the metals that can be used to provide the salts of said carboxylic acids polymers are the one, two, and three valence metals such as sodium, lithium, potassium, calcium, magnesium, aluminum, barium, zinc, zirconium, beryllium, iron, nickel, and cobalt.

Useful host polymers also include blends of various thermoplastic polymers and blends thereof containing conventional adjuvants such as antioxidants, light stabilizers, fillers, antiblocking agents, and pigments.

The host polymers may be used in the form of powders, pellets, granules, or in any other extrudable form. The most preferred olefin polymers useful in the invention are hydrocarbon polymers such as homopolymers of ethylene and propylene or copolymers of ethylene and 1-butene, 1-hexene, 1-octene, 4-methyl-1-pentene, propylene, vinyl acetate and methyl acrylate.

The melt processable composition of the invention can be prepared by any of a variety of ways. For example, the host polymer and the fluoropolymer processing additive can be combined together by any of the blending means usually employed in the plastics industry, such as with a compounding mill, a Banbury mixer, or a mixing extruder in which the processing additive is uniformly distributed throughout the host polymer. The processing additive and the host polymer may be used in the form, for example, of a powder, a pellet, or a granular product. The mixing operation is most conveniently carried out at a temperature above the melting point or softening point of the fluoropolymer, though it is also feasible to dry-blend the components in the solid state as particulates and then cause uniform distribution of the components by feeding the dry blend to a twin-screw melt extruder.

The resulting melt-blended mixture can be pelletized or otherwise comminuted into a desired particulate size or size distribution and fed to an extruder, which typically will be a single-screw extruder, that melt-processes the blended mixture. Melt-processing typically is performed at a temperature from 180° to 280° C., although optimum operating temperatures are selected depending upon the melting point, melt viscosity, and thermal stability of the blend. Different types of extruders that may be used to extrude the compositions of this invention are described, for example, by Rauwendaal, C., "Polymer Extrusion," Hansen Publishers, p. 23–48, 1986. The die design of an extruder can vary, depending on the desired extrudate to be fabricated. For example, an annular die can be used to extrude tubing, useful in making fuel line hose, such as that described in U.S. Pat. No. 5,284,184 (Noone et al.), which description is incorporated herein by reference.

The blended composition can contain conventional adjuvants such as antioxidants, antiblocks, pigments, and fillers, e.g. titanium dioxide, carbon black, and silica. Antiblocks, when used, may be coated or uncoated materials.

The fluoropolymer processing additive of this invention may also be combined with a poly(oxyalkylene) polymer component. The poly(oxyalkylene) polymer component may comprise one or more poly(oxyalkylene) polymers. A useful processing additive composition comprises between about 5 and 95 weight percent of the poly(oxyalkylene) polymer component and 95 and 5 weight percent of the fluoropolymer. Typically, the ratio of the fluoropolymer to the poly(oxyalkylene) polymer component in the processing aid will be from 1/2 to 2/1.

The poly(oxyalkylene) polymer component generally may comprise between about 0.005 and 20 weight percent of the overall melt processable composition, more preferably between about 0.01 and 5 weight percent, and most preferably between about 0.02 and 1 weight percent.

Generally, poly(oxyalkylene) polymers useful in this invention include poly(oxyalkylene) polyols and their derivatives. A class of such poly(oxyalkylene) polymers may be represented by the general formula:

$$A[(OR^3)_xOR^2]_y$$

wherein:
  A is an active hydrogen-free residue of a low molecular weight, initiator organic compound having a plurality of active hydrogen atoms (e.g., 2 or 3), such as a polyhydroxyalkane or a polyether polyol, e.g., ethylene glycol, glycerol, 1,1,1-trimethylol propane, and poly(oxypropylene) glycol;
  y is 2 or 3;
  $(OR^3)_x$ is a poly(oxyalkylene) chain having a plurality of oxyalkylene groups, $(OR^3)$, wherein the $R^3$ moieties can be the same or different and are selected from the group consisting of $C_1$ to $C_5$ alkylene radicals and, preferably, $C_2$ or $C_3$ alkylene radicals, and x is the number of oxyalkylene units in said chain. Said poly(oxyalkylene) chain can be a homopolymer chain, e.g., poly(oxyethylene) or poly(oxypropylene), or can be a chain of randomly distributed (i.e., a heteric mixture) oxyalkylene groups, e.g., a copolymer $—OC_2H_4—$ and $—OC_3H_6—$ units, or can be a chain having alternating blocks or backbone segments of repeating oxyalkylene groups, e.g., a polymer comprising $-(OC_2H_4)_a$ and $-(OC_3H_6)_b$ blocks, wherein a+b=5 to 5000 or higher, and preferably 10 to 500.
  $R^2$ is H or an organic radical, such as alkyl, aryl, or a combination thereof such as aralkyl or alkaryl, and may contain oxygen or nitrogen heteroatoms. For example, $R^2$ can be methyl, butyl, phenyl, benzyl, and acyl groups such as acetyl ($CH_3CO—$), benzoyl ($C_6H_5CO—$) and stearyl ($C_{17}H_{35}CO—$).

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g., stearate gorups, ($C_{17}H_{35}COO—$). Other useful poly(oxyalkylene) derivatives are polyesters, e.g., prepared from dicarboxylic acids and poly(oxyalkylene) glycols. Preferably, the major proportion of the poly(oxyalkylene) polymer derivative by weight will be the repeating oxyalkylene groups, $(OR^1)$.

The poly(oxyalkylene) polyols and their derivatives can be those which are solid at room temperature and have a molecular weight of at least about 200 and preferably a molecular weight of about 400 to 20,000 or higher. Poly(oxyalkylene) polyols useful in this invention include polyethylene glycols which can be represented by the formula $H(OC_2H_4)_nOH$, where n is about 15 to 3000, such as those sold under the Carbowax trademark, such as Carbowax™ PEG 8000, where n is about 181, and those sold under the trade name Polyox, such as Polyox™ WSR N-10 where n is about 2272.

The following examples are offered to aid in a better understanding of the present invention. These examples are not to be construed as an exhaustive compilation of all embodiments of the present invention and are not to be unnecessarily construed as limiting the scope of this invention.

EXAMPLES 1–4/C1–C4

Perfluorovinyl ether modified fluoropolymers and fluoropolymers that were not modified with perfluorovinylether were prepared. The fluoropolymers were compared to demonstrate the effect that modifying the fluoropolymers in this way had on the melt processability of host polymers. In these examples the improvement in melt processability was demonstrated by the improvement in eliminating melt fracture during blown film extrusion.

The following monomer compositions were used to prepare the fluoropolymers:

extrudable composition using the modified fluoropolymer of Example 4 had only 5% melt fracture after 120 minutes while the extrudable composition using the unmodified fluoropolymer of Example C4 had 55% melt fracture after 120 minutes.

EXAMPLES 5/C-5

Fluoropolymers that had been modified with perfluorovinyl ether were prepared and compared with those that were

| Monomer | Weight Percent | | | | | | | |
|---|---|---|---|---|---|---|---|---|
| Tetrafluoroethylene | | | 85 | 83 | 42 | 49 | 53 | 60 |
| Vinylidene Fluoride | 83 | 81.5 | | | 38 | 24 | | |
| Hexafluoropropylene | 17 | 17.1 | | | 20 | 22 | 36 | 23 |
| $CF_2\!=\!CFOCF_2CFOCF_2CF_2CF_3$ with $CF_3$ branch | | 1.4 | | | | | | |
| $CF_2\!=\!CFOCF_2CF_2CF_3$ | | | | | 6 | 5 | | 5 |
| Ethylene | | | | | | | 11 | 12 |
| Propylene | | | 15 | 11 | | | | |
| Peak Melt Temperature (° C.) | 112 | 111 | 95 | 95 | 125 | 126 | 124 | 147 |
| Melt Flow Index @ 265° C./5 Kg according to ASTM D1238 | 2 | 5 | 34 | 43 | 13 | 20 | 25 | 27 |
| Example | C1 | 1 | C2 | 2 | C3 | 3 | C4 | 4 |

The fluoropolymers of Examples C1–C3 and Examples 1–3 were used as polymer processing additives in a butene linear low density polyethylene host polymer that had a melt index of 1 and a density of 0.918. The extrusion die temperature was maintained at 199° C. The extruder was operated at a shear rate of 600 sec$^{-1}$. The fluoropolymer was employed at a level of 750 or 800 parts per million (ppm) of the host polymer. That corresponds to a level of 0.075 or 0.08 percent by weight of the fluoropolymer.

The efficacy of the fluoropolymer as a processing additive was shown by preparing masterbatches having 3 weight % of the fluoropolymer in the host polymer, pelletizing the master batch and then tumble blending pellets of the masterbatch with the polyethylene and then extruding the blend on a 4.44 cm laboratory blown film line with a 40 mm grooved feed extruder. The blown film line was equipped with a screw having a length/diameter ratio of 24/1, and 18/35/60 mesh screen pack, a 40 mm die with a 2 mm die gap, and a single lip air ring. The extruder temperature profile was adjusted to give the die temperature specified above.

Process aid performance was assessed based on % melt fracture measured in film samples at regular intervals. The results of the tests are shown in FIGS. 1 and 2.

FIG. 1 compares Examples C1 and 1 and shows that melt fracture is cleared substantially earlier with the processing additive of the invention than with the non-modified fluoropolymer.

Figure 2:
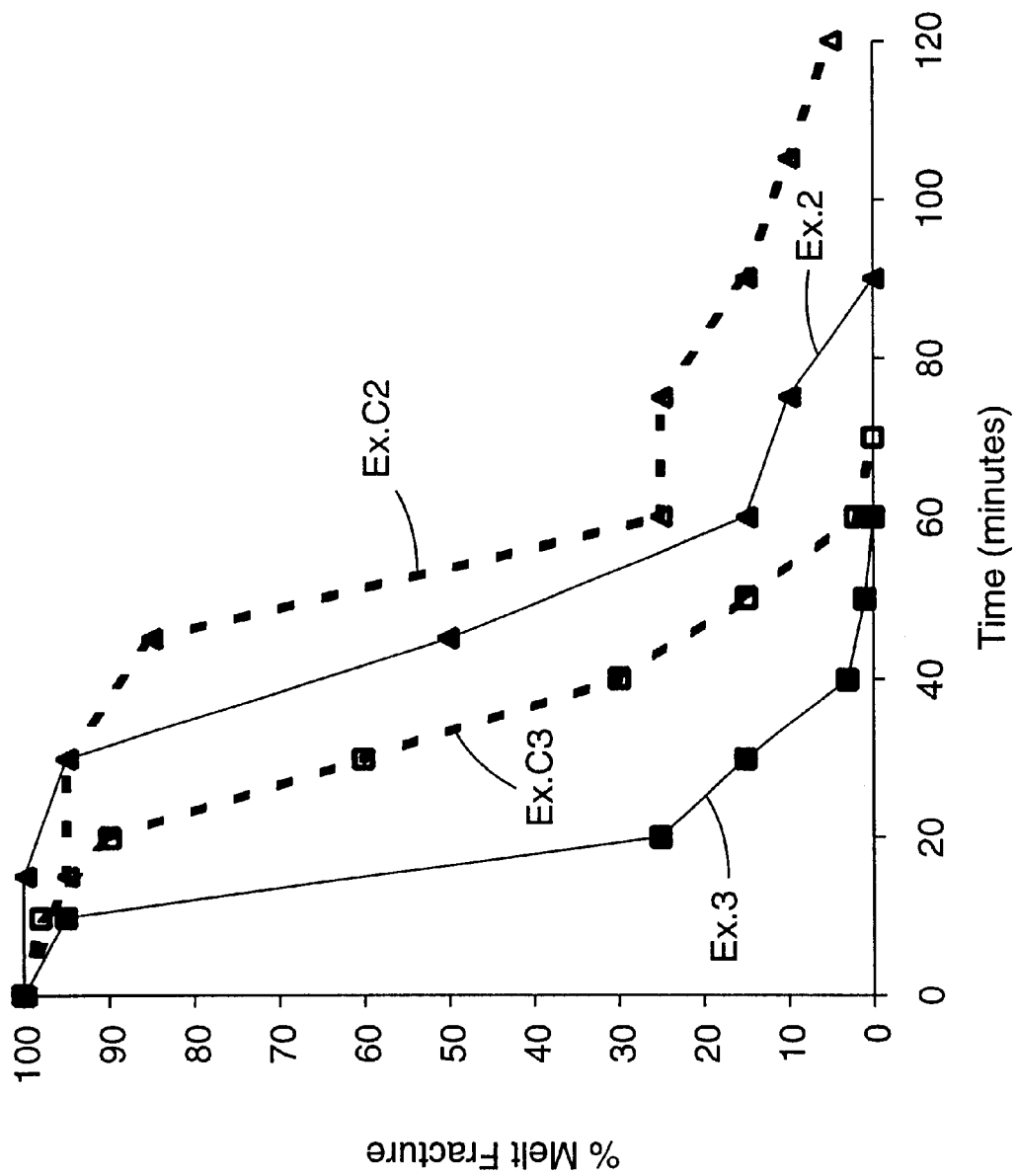

FIG. 2 compares Example C2 with Example 2 and Example C3 with Example 3. These comparisons show that melt fracture is cleared substantially earlier with the processing additive used in this invention than when the non-modified processing additive is used.

The polymers of Example C4 and Example 4 were evaluated in the same way except that the host polymer was an octene linear low density polyethylene that had a melt index of 1.0 and a density of 0.920; and the die temperature was 232° C. The fluoropolymer was used at a level of 750 ppm. All other experimental conditions were the same. The not so modified to demonstrate the resistance of the modified fluoropolymers to amine-based additives present in an extrudable composition, The improvement is demonstrated in the elimination of melt fracture during blown film extrusion of a polyolefin.

Example 5 employed the modified thermoplastic fluoropolymer of Example 2. Example C-5 employed an unmodified fluoroelastomer composition commercially available from Dyncon LLC as Dynamar™ FX-9613 (40 wgt. % VDF/60 wgt. % HFP copolymer). The polyolefin host polymer was an octene linear low density polyethylene that had a melt index of 1, a density of 0.920. The extrusion die temperature was maintained at 232° C. The extruder was operated at a shear rate of 600 sec$^{-1}$. The fluoropolymers were employed at a level of 750 ppm. The extrudable compositions also included 3000 ppm of an amine-based additive (Chimassorb 944 available from Ciba Specialty Chem.)

Figure 3:
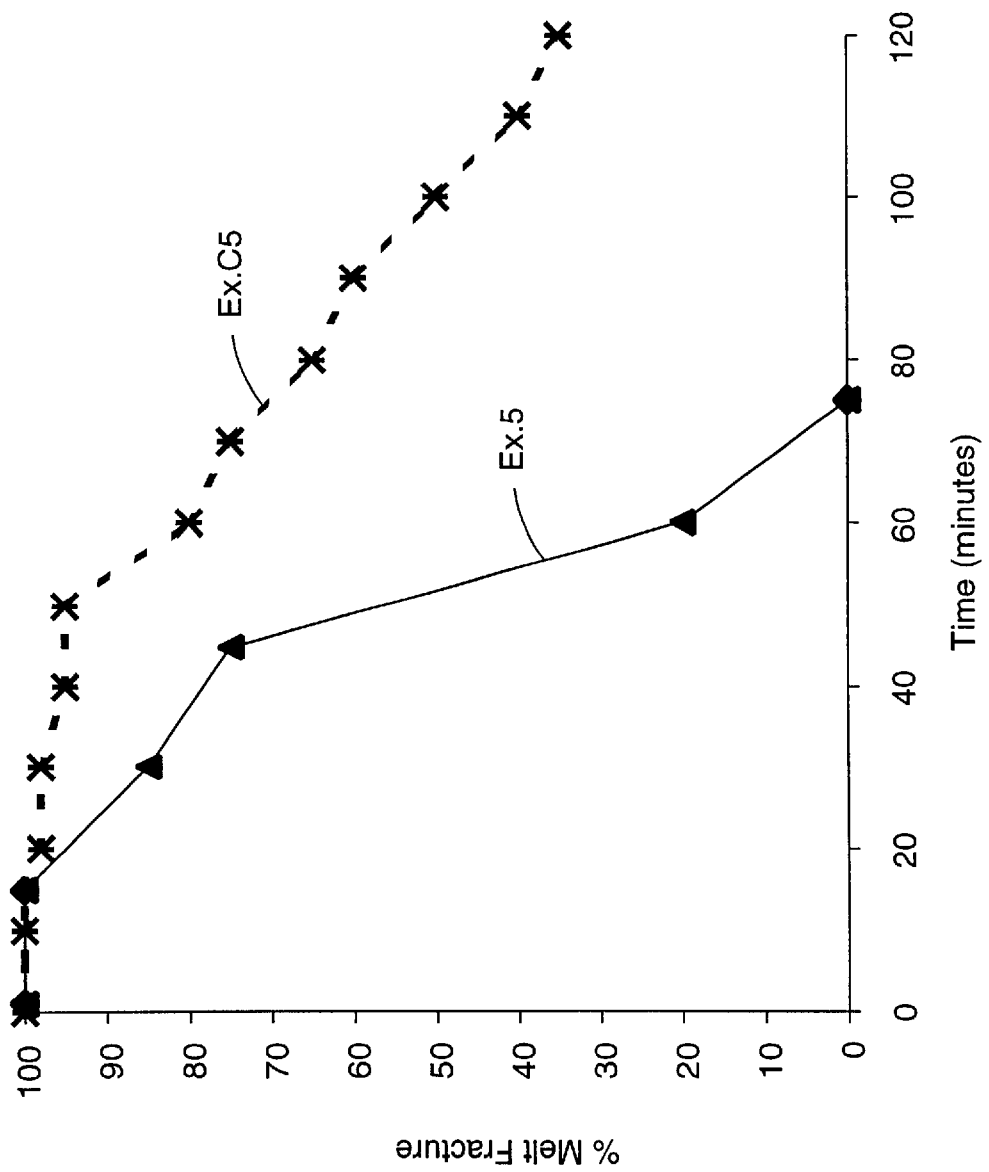

The blown film line was operated at the same conditions employed in Examples 1–4/C1–C4. The results of the comparison are shown in FIG. 3.

This comparison (see FIG. 3) clearly shows that the modified fluoropolymer was resistant to the basic additive. It showed significant improvement in melt processability over the use of the unmodified fluoropolymer FX-9613.

Additionally, FX-9613 shows significantly higher levels of melt fracture in the presence of Chimassorb 944 while the performance of the modified fluoropolymer was unchanged.

EXAMPLES 6/C6

Figure 4:
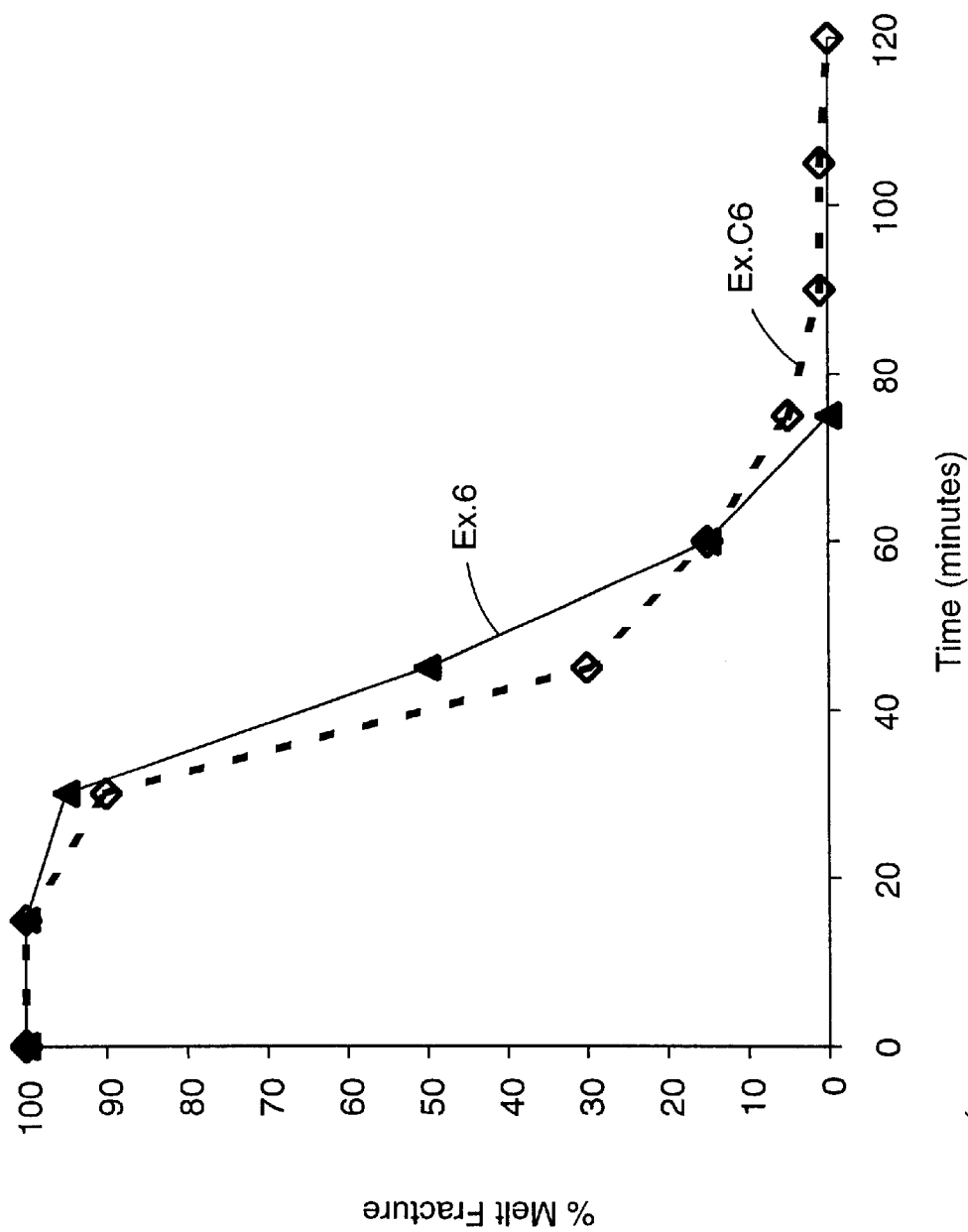

Example 6 demonstrates the improvement in melt processability achieved when a non-modified fluoroplastic is blended with a modified fluoroclastomer. The processing additive comprised a blend of 10 weight % the modified fluoroelastomer (68 mole % TFE/32 mole % perfluoromethyl vinyl ether, Mooney viscosity of 96.7) and 90 weight % of the unmodified fluoropolymer of Example C2. As shown in FIG. 4, Example 6 shows an improvement in melt fracture.

EXAMPLE 7–8

These examples demonstrate the further improvement in melt processability that can be achieved by adding a poly(oxyalkylene) polymer to the processing additive composition.

Figure 5:
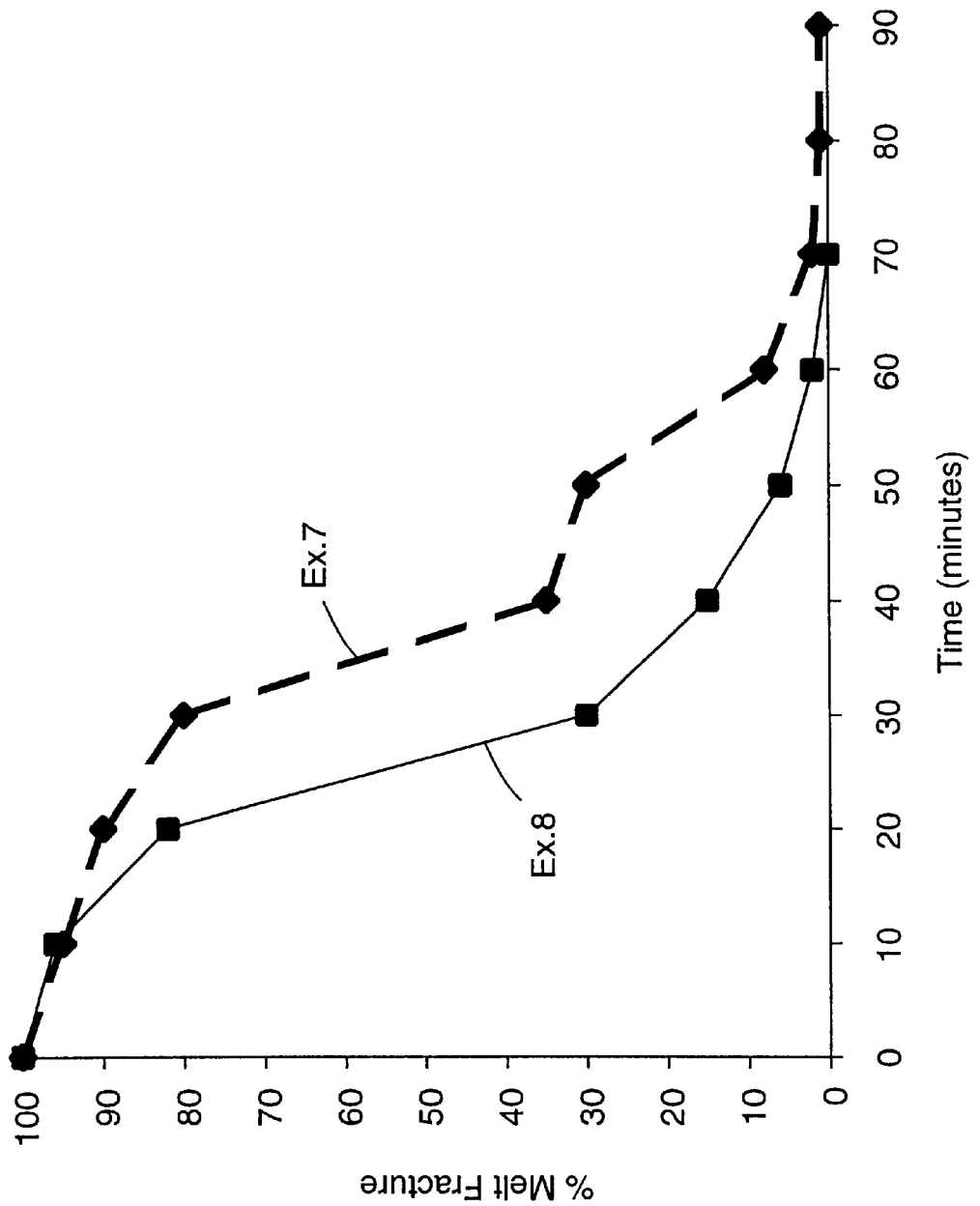

The host polymer and conditions used in the blown film extrusion were the same as employed in Examples 5/C5. In Example 7, 750 ppm of a modified fluoropolymer derived from 89 weight % TFE, 6.9 weight % propylene and 4.1 weight % $CH_2=CFOCF_2CF_2CF_3$ was used. This fluoropolymer had a peak melting temperature of 171° C. and an MFI (265° C./5 Kg) of 18. In Example 8, 250 ppm of this fluoropolymer was used along with 500 ppm of polyoxyethylene glycol (Carbowax® PEG 8000 available from Union Carbide) was used. FIG. 5 shows the further improvement in melt processability achieved.

What is claimed is:

1. A processing additive composition for improving the melt processability of a melt processable host polymer, the additive composition comprising a fluoropolymer of interpolymerized units derived from a monomer composition of
   (i) from 0.1 to 10 percent by weight of a perfluoro vinyl ether having the formula $CF_2=CF-(OCF_2CF(CF_3))_A OR_f$ where A has a value of from 0 to 3 and $R_f$ is a fluoroaliphatic group having from 1 to 8 carbon atoms;
   (ii) from 60–99.9 percent by weight of a fluorinated olefinic monomer having the formula $RCF=CR_2$ (II) where R is H, F, Cl, alkyl of from 1 to 8 carbon atoms, or perfluoroalkyl of from 1 to 8 carbon atoms; and
   (iii) from 0 to 30 percent by weight of a nonfluorinated olefinic monomer having the formula $CH_2=CR'_2$ wherein R' is selected from H, Cl or an aliphatic group having from 1 to 8 carbon atoms;
provided that when the monomer composition is free from the non-fluorinated monomer, the monomer composition comprises from 0.1 to 10 percent by weight of the perfluorovinyl ether monomer and from 90 to 99.9 percent by weight of at least two different fluorinated olefinic monomers.

2. A processing additive composition according to claim 1 wherein the fluoropolymer is amorphous.

3. A processing additive composition according to claim 1 wherein the fluoropolymer is semicrystalline.

4. A processing additive composition according to claim 1 wherein $R_f$ is selected from a fluoroalkyl or a fluoroalkoxy group having from 1 to 8 carbon atoms.

5. A processing additive composition according to claim 1 further comprising an adjuvant.

6. A processing additive composition according to claim 1 further comprising a poly(oxyalkylene) component.

7. A processing additive composition according to claim 1 wherein the monomer composition comprises a monomer of the formula $CF_2=CF-(OCF_2CF(CF_3))_A OR_f$, vinylidene fluoride, and hexafluorapropylene.

8. A processing additive composition according to claim 1 wherein the monomer composition comprises a monomer of the formula $CF_2=CF-(OCF_2CF(CF_3))_A OR_f$, tetrafluoroethylene, and at least one additional monomer of the formula $RCF=CR_2$ other than tetrafluoroethylene.

9. A processing additive composition according to claim 1 wherein the monomer composition comprises a monomer of the formula $CF_2=CF-(OCF_2CF(CF_3))_A OR_f$, at least one monomer of the formula $RCF=CR_2$ and a monomer of the formula $CH=CR'_2$.

10. A processing additive composition according to claim 1 wherein the monomer composition is free from a monomer of the formula $CH=CR'_2$.

11. A melt processable polymer composition comprising a major amount of a melt processable thermoplastic host polymer and a minor amount of the processing additive composition according to claim 1.

12. A melt processable composition according to claim 11 wherein the host polymer comprises from about 50 to 99.995 weight % of the composition.

13. A melt processable composition according to claim 11 wherein the host polymer is a polyolefin.

14. A melt processable composition according to claim 11 wherein the host polymer is a non-hydrocarbon polymer.

15. A method for improving the melt processability of a melt processable thermoplastic host polymer which comprises the steps of forming a melt processable polymer composition comprising the host polymer and an effective amount of the processing additive composition according to claim 1; mixing the processing additive composition and the host polymer; and melt processing the polymer composition.

16. A method according to claim 15 wherein the melt processable polymer composition comprises from 50 to 99.995 weight percent of the host polymer and from 50 to 0.005 weight percent of the processing additive.

17. A method according to claim 16 wherein the melt processable polymer composition comprises from 98 to 99.995 weight percent of the host polymer and from 2 to 0.005 weight percent of the polymer processing additive.

18. A method according to claim 16 wherein the host polymer comprises a polyolefin.

19. A method according to claim 16 wherein the host polymer comprises a non-hydrocarbon polymer.

20. A processing additive composition according to claim 1 wherein the fluoropolymer is non-reactive to base or amine functionalities.

21. A processing additive composition according to claim 1 wherein the fluoropolymer is blended with a second fluoropolymer that has not been modified with the perfluorovinyl ether.

22. A processing additive composition according to claim 1 wherein the fluoropolymer is multimodal.

* * * * *

UNITED STATES PATENT AND TRADEMARK OFFICE
CERTIFICATE OF CORRECTION

PATENT NO.     : 6,380,313 B1
DATED          : April 30, 2002
INVENTOR(S)    : Maria P. Dillon, Harald Kaspar, Bernhard Hirsch, Klaus Hintzer and Karl-Dieter Weilandt It is certified that error appears in the above-identified patent and that said Letters Patent is hereby corrected as shown below:

Column 1,
Line 36, delete "(BDPE)" and insert in place thereof -- (HDPE) --.

Column 5,
Line 17, delete "tile" and insert in place thereof -- the --.
Line 55, delete "thereof Perfluoro-" and insert in place thereof -- thereof. Perfluoro- --.

Column 6,
Line 1, delete "(RFP)" and insert in place thereof -- (HFP) --.
Line 37, delete "R'$^f$" and insert in place thereof -- R'$_f$ --.
Line 39, delete "Formula I, Polymers" and insert in place thereof -- Formula I. Polymers --.
Line 56, delete "$CF_2=CF-(OCF2CF(CF_3))aOR'_f$" and insert in place thereof -- $CF_2=CF-(OCF_2CF(CF_3))_aOR'_f$ --.

Column 13,
Line 55, delete "hexafluorapropylene" and insert in place thereof
-- hexafluoropropylene --.

Signed and Sealed this

Twenty-sixth Day of November, 2002

Attest:

*Attesting Officer*

JAMES E. ROGAN
*Director of the United States Patent and Trademark Office*